United States Patent
Rhodes et al.

(10) Patent No.: US 8,531,918 B2
(45) Date of Patent: *Sep. 10, 2013

(54) UNDERWATER COMMUNICATIONS

(75) Inventors: Mark Rhodes, West Lothian (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,501

(22) Filed: Mar. 12, 2012

(65) Prior Publication Data

US 2012/0170421 A1    Jul. 5, 2012

Related U.S. Application Data

(63) Continuation of application No. 12/373,010, filed as application No. PCT/GB2007/002937 on Aug. 2, 2007, now Pat. No. 8,134,890.

(30) Foreign Application Priority Data

Aug. 3, 2006 (GB) .................................. 0615435.5

(51) Int. Cl.
*H04B 11/00* (2006.01)

(52) U.S. Cl.
USPC .......................................................... 367/131

(58) Field of Classification Search
USPC .............. 367/131, 128, 134; 73/865; 455/40
See application file for complete search history.

(56) References Cited

U.S. PATENT DOCUMENTS

| 3,732,534 | A | * | 5/1973 | Koomey et al. | 367/133 |
|---|---|---|---|---|---|
| 5,432,754 | A | * | 7/1995 | Brady et al. | 367/134 |
| 5,784,339 | A | * | 7/1998 | Woodsum et al. | 367/134 |
| 6,220,168 | B1 | * | 4/2001 | Woodall et al. | 367/134 |
| 7,394,724 | B1 | * | 7/2008 | Uzes | 367/134 |
| 7,711,322 | B2 | * | 5/2010 | Rhodes et al. | 367/131 |
| 7,796,466 | B2 | * | 9/2010 | Combee et al. | 367/134 |
| 7,853,206 | B2 | * | 12/2010 | Rhodes et al. | 367/131 |
| 7,873,316 | B2 | * | 1/2011 | Rhodes et al. | 367/131 |
| 8,055,193 | B2 | * | 11/2011 | Rhodes et al. | 367/131 |
| 8,134,890 | B2 | * | 3/2012 | Rhodes et al. | 367/131 |
| 2007/0297290 | A1 | * | 12/2007 | Vosburgh et al. | 367/131 |
| 2008/0144442 | A1 | * | 6/2008 | Combee et al. | 367/131 |
| 2008/0277194 | A1 | * | 11/2008 | Rapp et al. | 181/116 |
| 2009/0245025 | A1 | * | 10/2009 | Rhodes et al. | 367/134 |
| 2010/0085839 | A1 | * | 4/2010 | Rhodes et al. | 367/134 |
| 2010/0134319 | A1 | * | 6/2010 | Rhodes et al. | 367/131 |
| 2010/0135121 | A1 | * | 6/2010 | Rhodes et al. | 367/134 |
| 2010/0135122 | A1 | * | 6/2010 | Rhodes et al. | 367/134 |
| 2010/0278014 | A1 | * | 11/2010 | Rhodes et al. | 367/134 |
| 2012/0170415 | A1 | * | 7/2012 | Rhodes et al. | 367/131 |
| 2012/0170416 | A1 | * | 7/2012 | Rhodes et al. | 367/131 |
| 2012/0170417 | A1 | * | 7/2012 | Rhodes et al. | 367/131 |
| 2012/0170418 | A1 | * | 7/2012 | Rhodes et al. | 367/131 |
| 2012/0170419 | A1 | * | 7/2012 | Rhodes et al. | 367/131 |
| 2012/0170420 | A1 | * | 7/2012 | Rhodes et al. | 367/131 |
| 2012/0170421 | A1 | * | 7/2012 | Rhodes et al. | 367/131 |

FOREIGN PATENT DOCUMENTS

DE          10044322          9/2002

\* cited by examiner

*Primary Examiner* — Daniel Pihulic

(74) *Attorney, Agent, or Firm* — Paul Davis; Mintz Levin

(57) ABSTRACT

An environmental monitoring system including at least one underwater measurement device and a transmitter for transmitting data from the measurement device to an above water station using a magnetically coupled antenna.

15 Claims, 4 Drawing Sheets

UNDERWATER COMMUNICATIONS

CROSS-REFERENCE TO RELATED APPLICATIONS

This application is a continuation of U.S. Ser. No. 12/373,010 filed Jan. 8, 2009 now U.S. Pat. No. 8,134,890, which is a 371 of PCT/GB07/02937 filed Aug. 2, 2007, which is the PCT of GB 0615435.5 filed Aug. 3, 2006, all of which applications are fully incorporated herein by reference.

DESCRIPTION

The present invention relates to the use of electromagnetic or magnetic signals to provide telemetry data links with environmental and similar measuring equipment situated underwater.

BACKGROUND

Increased concern about the environment, especially the quality and condition of water in rivers, lakes and canals, has raised a general requirement for monitoring and measuring parameters relating to water to a much greater extent than hitherto. Due to practical limitations, sampling and testing of water has generally been done manually at only a few locations and with limited frequency. Part of the difficulty is that testing sites are often at inconvenient and remote places. While yielding only inadequate amounts of information, this process is very expensive in time, travel costs and labour, and cannot economically be extended to achieve the very much larger number of monitoring points and sampling frequencies required for enabling quick remedial action to counter pollution sources.

Automatic monitoring and measuring devices have been deployed recently in rivers, lakes and canals to increase the frequency of sampling. Commonly called sondes, these sensors measure a large number of possible different parameters relating to the condition of the water. Measurements typically include but are not limited to aspects such as: flow rate; water depth by pressure sensing; water depth by ultrasonic techniques; temperature; acidity/alkalinity (pH); conductivity; dissolved oxygen content; chlorophyll density; salinity and presence of chemicals such as ammonium salts and nitrates; presence of other specific pollutants determined by chemical analysis sensors; presence of blue-green and other potentially toxic algae; particulate content, and turbidity.

Typically, automatic sondes are raised manually from a river or lakebed by personnel on a boat and their data is downloaded to a data-storage device before being transported physically back to a laboratory or data centre. Usually, the position of each sonde is marked, for example, using a buoy or other marker. Sometimes, the sonde is physically connected to the buoy. In this case, the buoy can be arranged to contain a repeater station for taking data from the underwater sonde and transmitting it onwards by conventional short-range radio to a land station. Unfortunately, the presence of a buoy is undesirable because it can draw unwanted attention, with high probability of damage and theft of the equipment. Moreover, in places of natural beauty a visible buoy may be considered unacceptable. A buoy also may preclude the positioning of a sonde in places where there is passing water traffic, such as the middle of a canal which might otherwise be an optimal location.

In a few cases, sondes are connected by cable laid along the river or lake bottom to a node in an equipment cabinet on dry land near the bank, whence conventional communication methods are used to transmit results to a data centre in real-time. While accomplishing the goal of frequent results nearly in real-time, such a direct cable connection is not an ideal solution to the local communication problem. A cable laid along the bottom is expensive to install in a manner that will avoid accidental damage by watercourse users, maintenance operations and floods, and remain hidden for security reasons. It will usually require planning permission and is likely to require a trench in both its underwater and on-shore sections. Once a cable is deployed, repositioning of the sonde then becomes prohibitively difficult.

SUMMARY OF THE INVENTION

According to one aspect of the present invention, there is provided an environmental monitoring system including at least one underwater measurement device and a transmitter for transmitting data from the measurement device to an above water station using a magnetically coupled antenna. Preferably, transmitter is operable to transmit a digitally modulated electromagnetic or magnetic signal. The sonde and the transmitter can be separate, but connected units, although preferably, they are included in an integral unit.

Using electromagnetic or magnetic signals as the communication means avoids the need for a cable connection between a sonde and a cooperative communication node or station on-shore. In addition, it avoids the need for special preparation or installation work. Instead, simple positioning of the submerged sonde and its transmitting antenna at the bottom of the watercourse is usually all that is required. A further advantage is that by using a magnetically coupled antenna, lower transmission loss is gained over conventional electromagnetic antennas of the types commonly used in free space. This is because the through-water path is in a medium of significant conductivity that, while immediately attenuating an electrical field, leaves a magnetic field largely unaffected.

Environmental monitoring generally requires the transmission of only infrequent small volumes of data and lends itself ideally to the use of electromagnetic or magnetic communication, even although the path is partially through water. A sonde is typically required to report its results only occasionally, perhaps once a day but not usually more often than intervals of 15 minutes, a frequency considered almost real-time in the industry. On each transmission the volume of information is small, often not exceeding a few hundred bits of data. Consequently, for communication from/to a sonde, low signal frequencies and bandwidths are effective. For example, the frequency may be in the range of 100 Hz to 100 kHz. For greatest distance, low unwanted signal levels and electromagnetic noise, a signal frequency in the region of 3 to 5 kHz, preferably 4 kHz, will often be close to optimal. For example, in a 4 kHz implementation a sensor submerged in 10 m of fresh water could communicate at 1 kbps with a shore-based station 100 m away.

Conventionally, electromagnetic transmission has not been considered an effective method when communication is partially or wholly underwater, but our pending patent application PCT/GB2006/002123, the contents of which are incorporated herein by reference, describes how this may be accomplished over useful distances. One potential difficulty to be considered in communicating data underwater is the higher attenuation encountered by an electromagnetic signal when transmitted through this partially conductive medium. In the environmental monitoring applications envisaged, the communication distances required are relatively short, because of the inherent geographical dimensions of most bodies of water, and the fact that water is comparatively shallow. Because of this, and especially in the case of fresh water, which has only modest conductivity, the necessary distances are generally very suitable for electromagnetic or magnetic communication. The method and system of this invention provide a novel and particularly effective means of communication at low data rates between submerged water monitoring sondes and a shore station.

Preferably each sonde includes one or more sensors. The sensor(s) may be operable to measure one or more of the following: flow rate; water depth by pressure sensing; water depth by ultrasonic techniques; temperature; acidity/alkalinity (pH); conductivity; dissolved oxygen content; chlorophyll density; salinity and presence of chemicals such as ammonium salts and nitrates; presence of other specific pollutants determined by chemical analysis sensors; presence of blue-green and other potentially toxic algae; particulate content; and turbidity.

The invention is equally applicable to fresh water or seawater. Deployment is envisaged in rivers, estuaries, lakes and sea.

BRIEF DESCRIPTION OF THE DRAWINGS

Various aspects of the invention will now be described by way of example only and with reference to the accompanying drawings, of which.

DETAILED DESCRIPTION OF THE INVENTION

Figure 1:
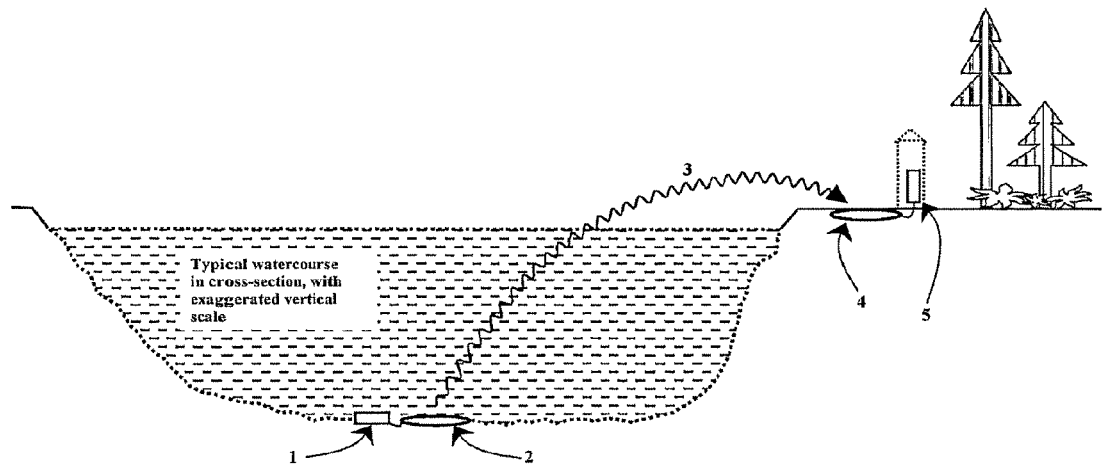
FIG. 1 is a schematic diagram of a communication system between an underwater sonde and a cooperative station on land nearby.

The present invention relates to an environmental monitoring system that has a data communication link that is partially or wholly underwater, and is used to convey data gathered by an underwater sonde to a cooperative local station, typically on land nearby. When required, the communication link may be used to control the operation of the sonde and/or its associated transmitter and receiver. The underwater transmitter and receiver may be considered a part of the sonde or an adjunct connected to it but, for best operational features, must work effectively as a single unit. Because the transmission path from the sonde includes an underwater portion, the communication method is radically different from that conventionally applicable to air propagation systems such as radio. This is primarily because water, especially saline water, exhibits much higher attenuation of the signal over distance. To alleviate the problem of high attenuation, magnetic coupled antennas are used.

Magnetic antennas, formed by a wire loop, coil or similar arrangement, create both magnetic and electromagnetic fields. Close to a transmit antenna there is a predominantly magnetic field that transitions, over an area conventionally known as the near field, to an electromagnetic field with an intrinsic impedance relationship between E and H (electric and magnetic) components characteristic of the medium. The magnetic or magneto-inductive field is generally considered to comprise two components of different magnitude that, along with other factors, attenuate with distance (r) at rates including a factor proportional to $1/r^2$ and $1/r^3$ respectively. Together these form the predominant near field components. The electromagnetic field has a still different magnitude and, along with other factors, attenuates with distance at a rate including a factor proportional to $1/r$. It is often termed the far field or propagating component. The far field is the area in which the electromagnetic transmission signal has transitioned to the characteristic impedance relationship between E and H components. The near field dominates at short distances, whereas the far field is relatively stronger at greater distances. Dependent on distance between the transmit antenna and the receive antenna, either or both near and far field components may be used. Using a magnetic coupled antenna rather than an electrically coupled antenna reduces signal dissipation in the near field, but allows data transmission in the near and far fields.

In the underwater environment, electrically insulated magnetically coupled antennas provide various advantages over the alternative of electrically coupled antennas. In far field electromagnetic propagation, the relationship between the electric and magnetic field is determined by the characteristic or intrinsic impedance of the transmission medium. An electrically coupled antenna launches a predominantly electric field that transitions to the characteristic impedance over the near field. Underwater attenuation is largely due to the effect of conduction on the electric field. Since electrically coupled antennas produce a higher E-field component in the near field the radiated signal experiences higher attenuation. The same performance issues apply to a receive antenna. Magnetically coupled antennas do not suffer from these problems and so are more efficient underwater than electrically coupled antennas.

FIG. 1 shows one embodiment of the invention in a watercourse such as a lake, river or canal. This has a sonde 1 that encapsulates transmitter and receiver circuits within its housing, as well as its measurement facilities. Optionally, the functions may be in separate but connected units. Connected to the transmitter/receiver in the sonde is a loop antenna 2. The antenna may be situated on the lakebed or at any point between the surface and lakebed. In the case where data is sent from the sonde, the signal is transmitted 3 to a nearby station, which may be on the shore, and has a receiver that has an antenna 4 that is connected to a communication module 5. Signals sent from the sonde are received by the antenna 4 and processed by the communication module 5. Communication module 5 may be housed in a small cabinet as depicted, but could be underground for reasons of aesthetics or avoidance of unwanted attention and damage. The antenna 4 could be positioned on the ground, underground, or in other convenient position. It could also be positioned in the water, perhaps close to the bank. The module 5 may gather and store the data. Alternatively, it may be configured to forward the data by conventional wireline or radio data transmission methods to a central monitoring site (not shown).

The shape of the coil antennas 2 and 4 at both ends of the link is not critical but the received signal will be maximised if they are nearly circular and each arranged to have a large area, because this creates the greatest magnetic signal flux for transmitting and intercepts maximum flux for receiving, both of which increase the received signal and/or enable performance over longer distance. For example, a coil antenna may have a typical cross sectional area of 0.2 square metres but may be increased or decreased dependent on distance and signal strength required. Multiple turns of one or both coils are usually beneficial because this also increases the signal flux created by a transmit antenna and the voltage induced in a receive antenna.

Figure 2A:
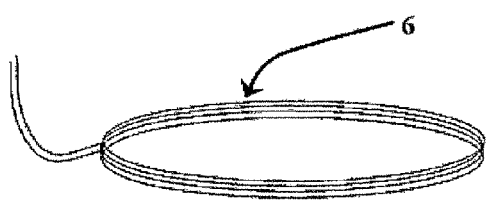
FIG. 2a represents a loop or coil antenna.
Figure 2B:
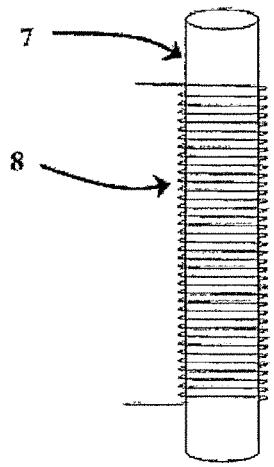
FIG. 2b represents another loop antenna in which a core of high magnetic permeability material is introduced into the coil to form a solenoid of more compact form.

FIG. 2a shows a simple coil antenna suitable for communication. This has multiple turns of wire 6, typically 100, insulated from the water and for connecting directly to the transmitter and/or receiver so that signal current flows in it. FIG. 2b depicts a similar coil modified to be more compact but with comparable performance. The coil 8 usual takes a solenoid shape, and has a highly permeable core 7, typically of known ferrite material, introduced within it.

Figure 3:
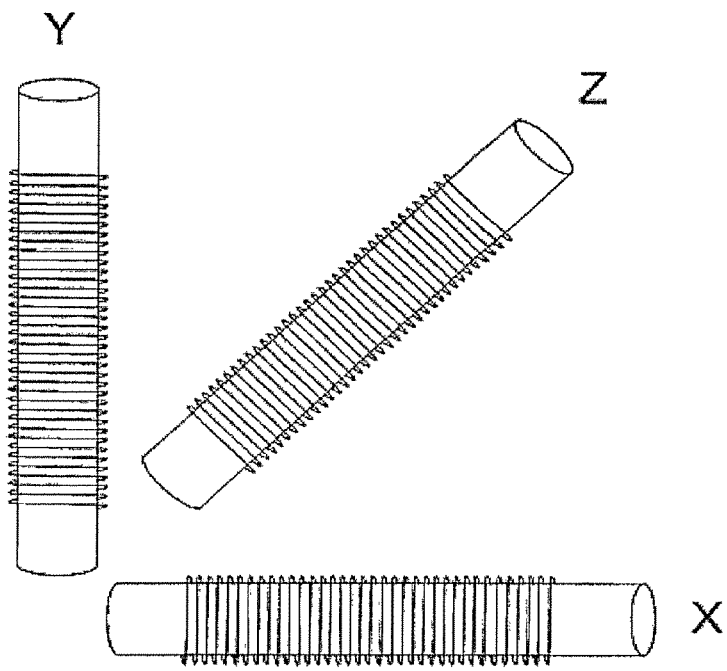
FIG. 3 represents an omni-direction antenna arrangement.

The permeable core multiplies the magnetic flux created by a coil by around 50 to 100 times, and therefore increases its effective size and ability to create and intercept a magnetic field. Another possible antenna arrangement is shown in FIG. 3. This has three orthogonal solenoids, which produce in approximation to omni-direction operation for use in situations where antenna alignment is difficult to maintain. In this case, each antenna is aligned with one of the three Cartesian axes.

Other aspects of the means of transmitting the data will be familiar to those skilled in the art, and are given here only in outline. The signal, modulated with data from the sonde, can be similar in concept and form to those found in many conventional radio systems but with a much lower carrier signal frequency, typically in the region of 4 kHz. The current in a transmitting loop antenna is typically a carrier signal modulated with the data by one of the many systems well known. Filtering, detection and demodulation of the received voltage induced in a receiving loop antenna again may be by well-known methods.

Figure 4:
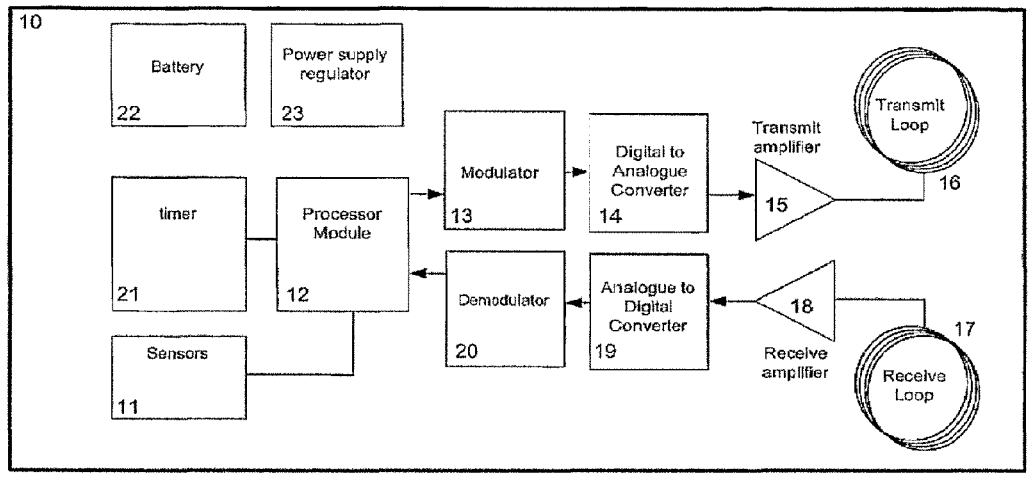
FIG. 4 is a functional block diagram of an underwater modem for communication with a sonde device.

FIG. 4 is a functional block diagram of a specific implementation of the underwater sonde 1 of FIG. 1. This has one or more underwater sensors 11 for measuring environmental data and a transmitter to allow data to be transmitted to the remote station. Measured data is passed to a processor 12. The processor 12 encodes the data to create a bit stream, which is passed to a modulator 13. The modulator 13 synthesises a digital representation of a modulated waveform, which is passed to a Digital to Analogue Converter (DAC) 14. The DAC 14 generates an analogue modulated waveform which is amplified by a transmit driver 15 and passed to a transmit loop antenna 16 for transmission. Incoming signals from the shore station are received at a receive antenna 17 and amplified by a receive amplifier 18. An Analogue to Digital Converter 19 creates a digital representation of the signal and a demodulator 20 extracts a digital data stream. This data is interpreted by the processor 12, which executes the appropriate control function. The equipment is housed in a single waterproof housing 10 and powered from a battery 22 conditioned by a power supply regulator 23.

Figure 5:
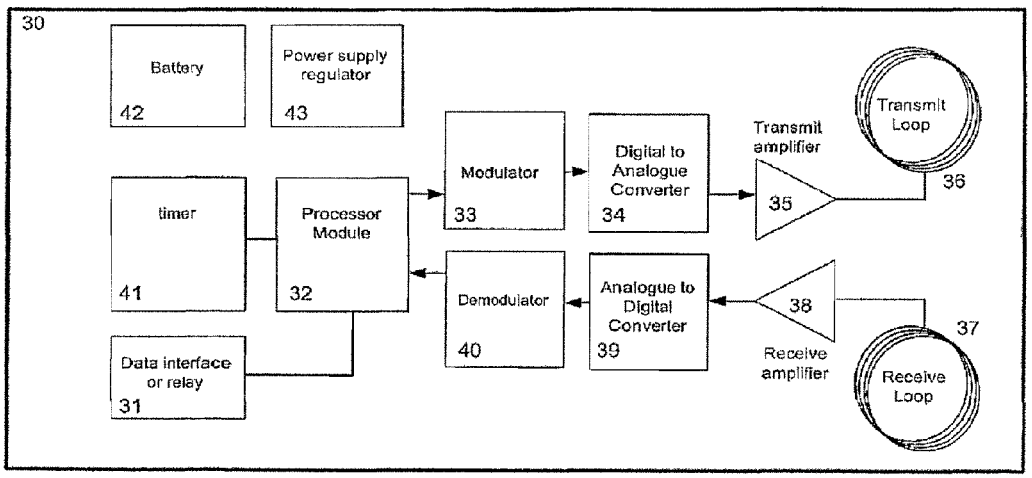
FIG. 5 is a functional block diagram of shore based communication station.

FIG. 5 is a functional block diagram of a specific implementation of the shore based communication station 5 of FIG. 1. The diagram illustrates the similarity with the submerged station for the example of half duplex communications provision. Configuration commands are passed from an external data interface 31 to a processor 32. The processor 32 encodes the data to create a bit stream, which is passed to a modulator 33. The modulator 33 synthesises a digital representation of a modulated waveform, which is passed to the Digital to Analogue Converter (DAC) 34. The DAC 34 generates an analogue modulated waveform which is amplified by a transmit driver 35 and passed to a transmit loop antenna 36. Incoming signals from the submerged station are received at a receive antenna 37 and amplified by a receive amplifier 38. An Analogue to Digital Converter 39 creates a digital representation of the signal and a demodulator 403 extracts a digital data stream. This data is interpreted by the processor 32, which presents the received data at the external data interface 31. The equipment is housed in a housing 30 and powered from a battery 42 conditioned by the power supply regulator 43.

Operational behaviour of the sonde can be altered by means of commands sent to it directly or indirectly from a central control site or other origin. As will be readily recognised, almost any feature of the sonde could be manipulated, but only some examples are given here. The interval between transmissions may be altered as desired or events require: for example the interval could be shortened when a known environmental problem needs special monitoring conditions of greater frequency than usual, and decreased on a later occasion. The threshold level at which a parameter measured by the sonde becomes designated an alarm condition could be altered from a control site. Selective features of the sonde could be commanded to be turned on and off as required. The power level of the transmitter could be changed to suit actual conditions of attenuation and distance, possibly as determined by signal strength received and measured by the cooperative shore receiver, thereby conserving battery energy by using only the minimum necessary transmitter power for adequate received signal. The sonde could be commanded to report the condition of its battery, thereby avoiding unnecessary early replacements or unexpected expiry failures so that costly maintenance visits are optimised. A sonde could be commanded to perform self-testing routines to assess its own operational readiness and accuracy, and to report the results.

It is usually desirable that a sonde located underwater should require little attention and operate from integral batteries for extended periods. To conserve battery energy, unnecessary operation or excessive power of the transmitter should be avoided. To achieve this, intermittent reporting of results can be used. For example, the sonde may be designed to transmit short bursts of data at periodic intervals, perhaps spaced by a known period such as 24 hours, 2 hours or 15 minutes, or according to a known schedule, dependent on requirements. This process, which may require less than a few seconds for each brief transmission, allows the transmitter to consume little or no power for the vast proportion of time. It should be noted that a known transmission interval will also allow a distant receiver to be operable only at times when a transmission is expected, and so can similarly conserve energy associated with a receiver at the nearby cooperative station if desired. As a further measure to conserve battery energy, the sonde receiver can be designed to adopt intermittent operation. If the system is arranged to have a predetermined cycle or pattern of possible times at which commands may be sent to the sonde, known mutually to both ends of the link, then the receiver in the sonde can be turned off during the periods in between, thereby avoiding unnecessary battery consumption associated with operation of the receiver.

In another enhancement, the sonde may be operable to transmit only when it has important or urgent data to send, such as on occasions of alarm when a key parameter such as a pollution level has been exceeded. This avoids both superfluous data and unnecessary battery consumption. As previously outlined, a sonde can be designed to receive and act on control signals sent to it from the land station, but usually originating from a central control site. Using this capability, a further enhancement provides for the sonde to transmit data only when commanded occasionally to do so, thereby avoiding unnecessary energy consumption by the sonde transmitter.

A further feature of this invention relates to finding a sonde, which has been hidden in a watercourse for reasons of security and has no buoy or other marker to indicate its position. A probe receiver, typically equipped with a coil antenna, can be used to detect signals from the sonde and home in on its position by means of signal strength, which increases with proximity. Electromagnetic signal strength decreases rapidly with distance in the near field region of a magnetically coupled antenna. Attenuation is increased still further as the signal passes through water. A boat equipped with a receiver will measure maximum received signal strength when directly above a submerged transmitter. This provides a simple means for location of a submerged transmitter. The high attenuation through water makes this method particularly effective since rapid variation of received power with distance allows accurate location. This location method is described in more detail in our pending patent application PCT/GB2006/002111, the contents of which are incorporated herein by reference. In contrast, conventional far field radio transmission through air experiences very low attenuation and signal strength location methods are rarely used. In a similar way a mobile receiver moving along a riverbank or lakeshore will measure maximum received signal strength when at the closest point to the transmitter.

Figure 6:
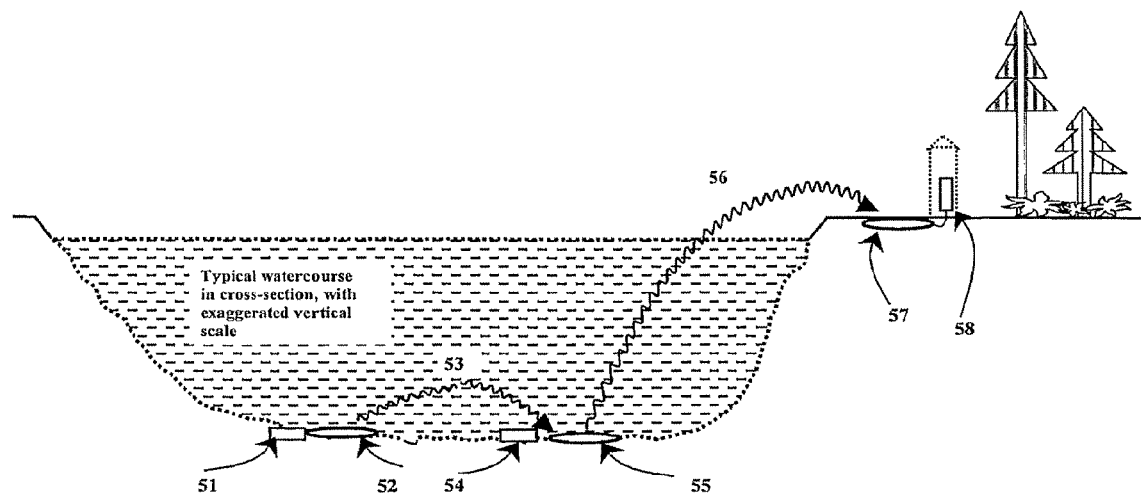
FIG. 6 is a schematic diagram of a communication system between an underwater sonde and a cooperative station on land nearby where communications range is extended by relaying data through an intermediate submerged modem.

FIG. 6 is a schematic diagram of a communication system between an underwater sonde and a cooperative station on land nearby where communications range is extended by relaying data through an intermediate submerged modem 54. Although a single intermediate relay station is shown the concept could readily be extended to any number of relay devices. FIG. 6 shows a cross-section of a watercourse such as a lake, river or canal, and a data communication system to allow an underwater sonde to communicate with a shore based station through a relay station. Housing 51 encapsulates both sonde and radio transceiver and is connected to antenna 52, which transmits a signal 53 to the receive antenna 55 of an intermediate transceiver 54. Antenna 55 generates a transmit signal 56 which is received by antenna 57 and passed to surface station 58. The intermediate station 54 can perform either a purely relaying function or can contain a sonde measuring device. Where intermediate relay stations contain a sonde device the associated modem will be individually accessible through an addressing scheme to allow recovery of measured data from each node in the chain through the relaying network.

A skilled person will appreciate that variations of the disclosed arrangements are possible without departing from the essence of the invention. For example, while the foregoing application examples relate to the transmission of data and control signals from/to an environmental measurement sonde underwater, it is readily apparent that the invention has greater generality and can be applied to many other systems requiring conveyance of measurements or other data from/to underwater sites. In addition, whilst the systems shown in FIGS. 4 and 5 have two antennas, one for the transmitter and one for the receiver, the same antenna may be used by transmitter and receiver, but, in the simplest arrangement, usually operative at different times. Accordingly, the above descriptions of specific embodiments are made by way of examples only and not for the purposes of limitation. It will be clear to the skilled person that minor modifications may be made without significant changes to the operation and features described.

The invention claimed is:

1. An automated environmental monitoring system comprising at least one underwater environmental measurement device and a transmitter for intermittently transmitting data from the measurement device in water to a receiver in air at an above water station using low frequency electromagnetic and/or magnetic signals, and/or a receiver for receiving data and/or commands from a transmitter in air at the above water station using low frequency electromagnetic and/or magnetic signals, wherein the transmitter and receiver include a magnetically coupled antenna.

2. A system as claimed in claim 1 wherein measured data is modulated on the electromagnetic or magnetic signal.

3. A system as claimed in claim 1, further including a processor, the processor executing one or more command signals received by the underwater receiver from the above water station.

4. A system as claimed in claim 1, wherein the submerged receiver is operable substantially only during periods when a command signal might be expected periodically or according to a predetermined schedule.

5. A system as claimed in claim 1, wherein the submerged transmitter is caused to transmit data as and when it becomes available.

6. A system as claimed in claim 1, wherein the underwater device is operative to report the condition of its battery supply periodically, or on a received command, or when the battery reaches a certain state of discharge.

7. A system as claimed in claim 1, wherein the underwater device is capable of performing a self-testing or assessment process on receipt of a command signal and transmitting the result of the process to the above water station.

8. A system as claimed in claim 1, wherein one or more of the antennas is omnidirectional.

9. A system as claimed in claim 8 wherein the omnidirectional antenna comprises three orthogonal antennas.

10. A system as claimed in claim 1 further comprising a waterproof housing, wherein the measurement device and transmitter/receiver circuitry are included in the housing.

11. A system as claimed in claim 1 wherein the measurement device transmitter is operable to transmit a signal to allow its underwater location to be determined.

12. A system as claimed in claim 11 wherein the position location signal is a regular operational signal or a signal sent as a result of a command for the purpose or a signal sent in response to one or more predetermined conditions detected by the measurement device.

13. A system as claimed in claim 1 wherein the measurement device is operable to measure one or more of the following: flow rate; water depth by pressure sensing; water depth by ultrasonic techniques; temperature; acidity/alkalinity (pH); conductivity; dissolved oxygen content; chlorophyll density; salinity and presence of chemicals such as ammonium salts and nitrates; presence of other specific pollutants determined by chemical analysis sensors; presence of blue-green and other potentially toxic algae; particulate content; and turbidity.

14. A system as claimed in claim 1, including an intermediate relaying station.

15. A waterproof sonde comprising at least one sensor for sensing at least one environmental parameter, and a transmitter for intermittently transmitting low frequency electromagnetic and/or magnetic signals carrying data from the sensor to an above-water location using a magnetically coupled antenna.

* * * * *